United States Patent [19]

Miura et al.

[11] Patent Number: 5,521,895

[45] Date of Patent: May 28, 1996

[54] OPTICAL DISK REPRODUCING APPARATUS FOR CONTROLLING THE ROTATIONAL SPEED OF A SPINDLE MOTOR BETWEEN A CLV CONTROL AND A CAV CONTROL

[75] Inventors: Tohru Miura, Chofu; Mitsumasa Kubo, Kodaira; Akira Mashimo, Tokorozawa, all of Japan

[73] Assignee: Teac Corporation, Japan

[21] Appl. No.: 504,933

[22] Filed: Jul. 20, 1995

[30] Foreign Application Priority Data

Jul. 28, 1994 [JP] Japan .................................. 6-177269

[51] Int. Cl.⁶ .................................................. G11B 7/00
[52] U.S. Cl. .................................. 369/50; 369/124
[58] Field of Search .......................... 369/50, 32, 54, 369/44.26, 124

[56] References Cited

U.S. PATENT DOCUMENTS 5,278,814  1/1994  Deguchi et al. ......................... 365/50

FOREIGN PATENT DOCUMENTS 1-60863   3/1989  Japan .
2-158966  6/1990  Japan .
3-105768  5/1991  Japan .
5-28632   2/1993  Japan .
5-189889  7/1993  Japan .
5-250804  9/1993  Japan .

*Primary Examiner*—Nabil Z. Hindi
*Attorney, Agent, or Firm*—Ladas & Parry

[57] ABSTRACT

An optical disk reproducing apparatus uses a spindle motor having a low torque to reduced power consumption and manufacturing cost while maintaining a low error rate for reproduced data. The spindle motor is rotated at a constant rotational speed under a CAV control when a pick-up is moved. The rotational speed of the spindle motor is switched to a reference linear speed under a CLV control when a reproducing operation is performed. The reference linear speed is established for each of the zones of a recording area of an optical disk. The reference linear speed is determined by generating a zone clock set for each of the zones. A frequency error signal is generated by comparing the zone clock with the reproduction data so as to maintain the spindle motor at the reference linear speed determined by the zone clock.

11 Claims, 10 Drawing Sheets

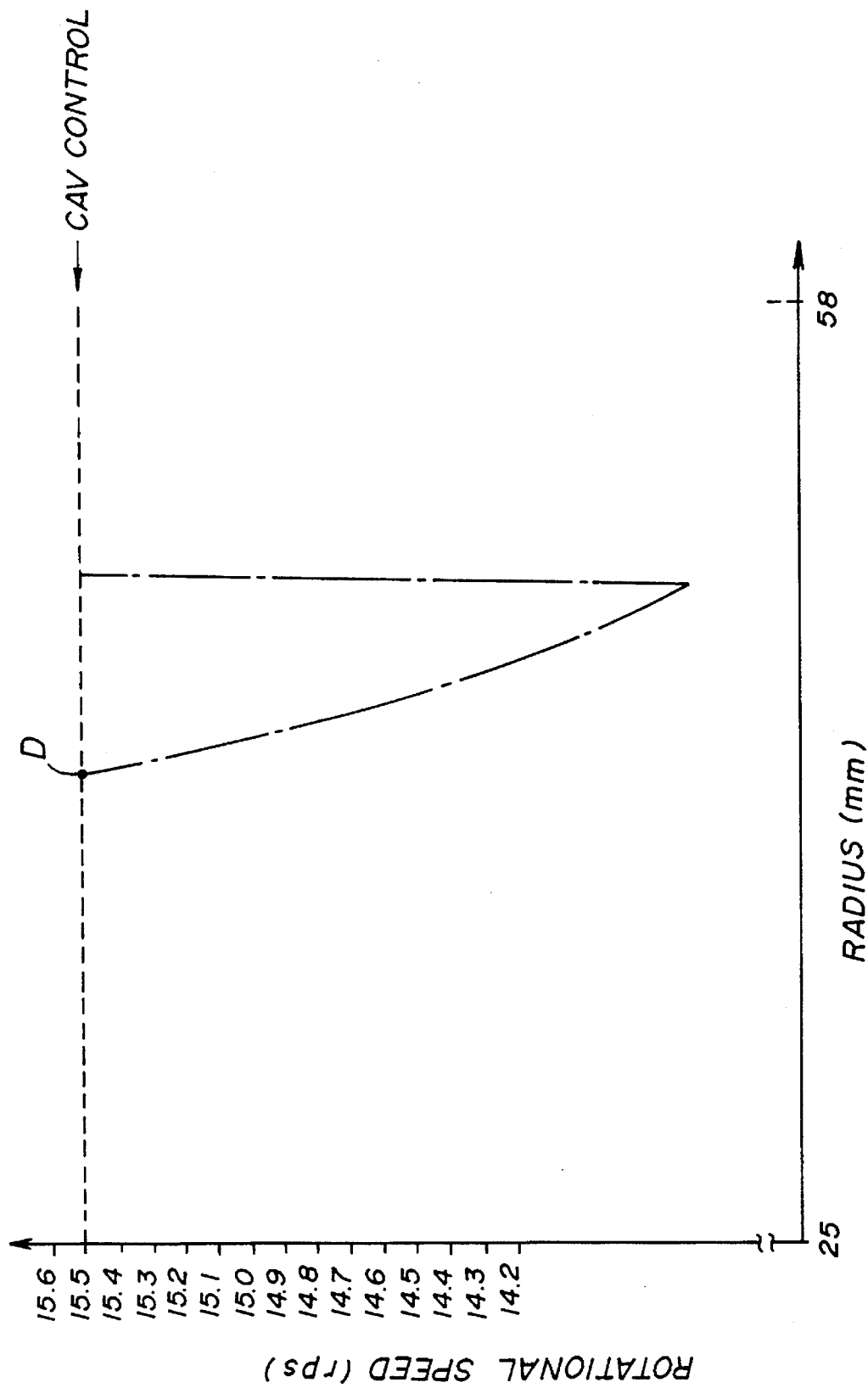

5,521,895

OPTICAL DISK REPRODUCING APPARATUS FOR CONTROLLING THE ROTATIONAL SPEED OF A SPINDLE MOTOR BETWEEN A CLV CONTROL AND A CAV CONTROL

This application claims priority from Japanese Patent Application 6-177269 filed Jul. 28, 1994. Said document is incorporated herein by reference.

BACKGROUND OF THE INVENTION

1. Field of the Invention

The present invention generally relates to optical disk apparatuses and, more particularly, to an optical disk apparatus which reproduces information recorded on an optical disk such as a CD-ROM, the information being recorded by using a CLV controlling method.

2. Description of the Related Art

Generally, similar to a compact disk (CD) used for audio recording, an optical disk (hereinafter referred to as simply a disk) such as a CD-ROM records digital signals according to a modulation method referred to as an Eight to Fourteen Modulation (EFM).

In the conventional CD-ROM, an interval between each bit signal and an interval between each frame signal recorded on the CD-ROM are the same on an inner side and an outer side of the disk. Accordingly, The conventional CD-ROM reproducing apparatus controls the rotational speed of the disk so that the linear velocity of an optical head relative to the disk is always constant. This control is referred to as a constant linear velocity (CLV) control method. That is, the rotational speed of the disk is varied according to a position of the optical head along a radial direction of the disk. Thus, when the optical head is moved to a target address, the rotational speed of a spindle motor must be changed to the rotational speed required at the target address from the rotational speed required at the current address of the optical head.

In the above-mentioned conventional CD-ROM apparatus, in order to achieve a high speed seek operation, a spindle motor which has a short control time for its rotational speed is required. Such a spindle motor requires a high torque and, thus, there is a problem in that the spindle motor is expensive. Additionally, since a rotational speed of the spindle motor is greatly varied during a seek operation, there is a problem in that power consumption of the spindle motor is increased.

In order to eliminate the above-mentioned problems, it has been suggested to reproduce information on the disk which was recorded by the CLV control method by using a constant angular velocity (CAV) control method. In this attempt, a synchronization clock signal derived from a reproduction signal by a reproduction PLL circuit is used as a read reference clock signal required for an operation such as an error correction after a demodulation of data. Accordingly, if a synchronization of the reproduction PLL circuit fails, it is not possible to perform an error correction after a demodulation of data. Thus, there is a problem in that error rate in the reproduced data is increased.

SUMMARY OF THE INVENTION

It is a general object of the present invention to provide an improved and useful optical disk reproducing apparatus in which the above-mentioned problems are eliminated.

A more specific object of the present invention is to provide an optical disk reproducing apparatus using a spindle motor having a low torque so as to reduce power consumption and a manufacturing cost while the error rate for reproduced data is maintained at a low level.

In order to achieve the above-mentioned problems, there is provided according to the present invention an optical disk reproducing apparatus for reproducing data recorded on an optical disk by reading a digital signal including clock information by an optical pick-up, the digital signal being recorded in a uniform recording density, the optical disk reproducing apparatus comprising:

a spindle motor for rotating the optical disk in accordance with a rotation control signal;

constant rotational speed controlling means for generating a constant rotational speed controlling signal which controls a rotational speed of the optical disk at a constant rotational speed;

switching means for outputting the constant rotational speed controlling signal as the rotation controlling signal when the optical pick-up is moved during a seek operation, and outputting a constant linear speed controlling signal as the rotation controlling signal when reproducing the data recorded on the optical disk, the constant linear speed controlling signal controlling the rotational speed of the optical disk at a constant liner speed;

digital signal reproducing means for generating a reproduction digital signal from a reproduction signal supplied by the optical pick-up;

radial position information generating means for generating radial position information representing a radial distance of the optical pick-up from a center of the optical disk by using the reproduction digital signal supplied by the digital signal reproducing means while the optical disk is rotated at a constant rotational speed by the constant rotational speed controlling means;

read reference clock generating means for generating a read reference clock used as a reference clock for determining a reference linear speed of the optical disk relative to the optical pick-up during a reproducing operation, a frequency of the read reference clock increasing as the radial distance represented by the radial position information increases;

a reproduction PLL circuit for generating reproduction data and a synchronization signal which are in synchronization with the reproduction digital signal supplied by the digital signal reproducing means, the reproduction PLL circuit comprising a variable frequency oscillator so that a self-scan frequency is set in the variable frequency oscillator, the self-scan frequency increasing as the radial distance represented by the radial position information increases; and constant linear speed controlling means for supplying a frequency error signal to the switching means as the constant linear speed controlling signal by comparing the read reference clock with the reproduction data so that the spindle motor maintains the reference linear speed determined by the read reference clock.

According to the above-mentioned invention, a range of variation in the rotational speed of the spindle motor during a seek operation can be reduced by setting the reference linear speed which increases in a radially outward direction of the disk. Accordingly, when an attempt for achieving a desired seek operation time is made, the torque of the spindle motor can be greatly reduced as compared to the conventional apparatus using the CLV control. Thus, a cost of the spindle motor is reduced, and the power consumption of the spindle motor during a seek operation can be reduced. Additionally, since the range of variation in the rotational speed of the spindle motor is decreased, the seek time can be less than that of the conventional apparatus by using a spindle motor having an appropriate torque. Additionally, since an error correction is performed by using the reference clock, which is independent from the synchronization clock generate by the reproduction PLL circuit, an error rate is maintained at the same level as that of the conventional apparatus using the CLV control.

Other objects, features and advantages of the present invention will become more apparent from the following detailed description when read in conjunction with the accompanying drawings.

BRIEF DESCRIPTION OF THE DRAWINGS

FIG. 10 is an illustration for explaining a CAV control and a CLV control in the second embodiment.

DETAILED DESCRIPTION OF THE PREFERRED EMBODIMENTS

Figure 1:
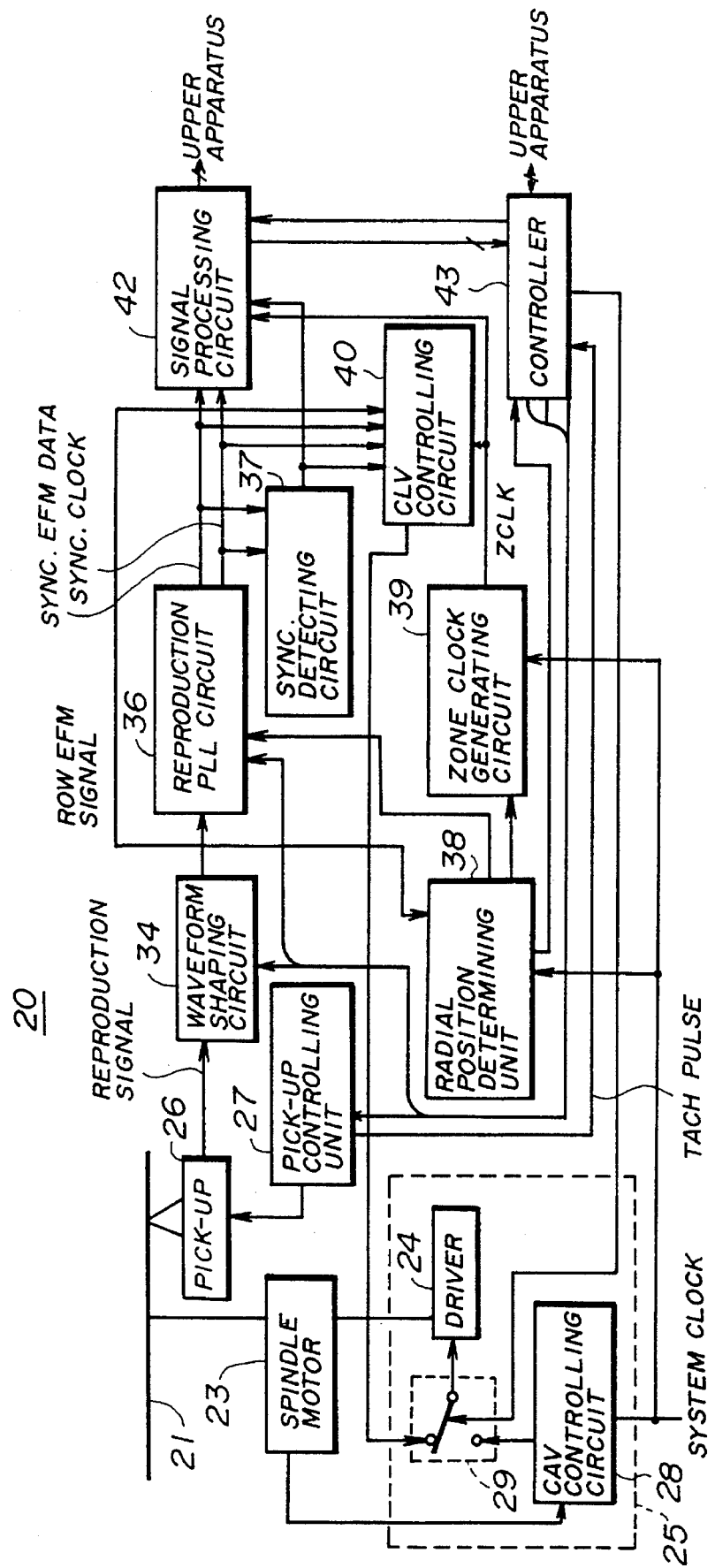
FIG. 1 is a block diagram of a CD-ROM reproducing apparatus according to a first embodiment of the present invention.

A description will now be given of a first embodiment of the present invention. FIG. 1 is a block diagram of a CD-ROM reproducing apparatus 20 according to the first embodiment of the present invention. A CD-ROM disk (hereinafter simply referred to as a disk) 21 records digital signals at a constant bit density over the entire recording area by using the EFM method. The signals recorded on the disk 21 can be reproduced at a constant bit rate based on the CLV control method.

A spindle motor drive controlling unit 25 comprises a constant angular velocity (CAV) controlling circuit 28, a driver 24 and a switching circuit 29. The disk 21 is directly rotated by a spindle motor 23. The spindle motor 23 has an FG pulse generator. An FG pulse generated by the FG generator is supplied to the CAV controlling circuit 28. The CAV controlling circuit 28 (constant rotational speed controlling means) compares a reference signal, which is obtained by counting-down a system clock, with the FG pulse with respect to their frequencies and phases so as to generate a CAV controlling signal (constant rotational speed controlling signal). The CAV controlling signal is used for controlling the rotational speed of the spindle motor at a constant speed. Switching means is provided which comprises the switching circuit 29 and a controller 43 which controls a switching operation of the switching circuit 29. When the switching circuit 29 is switched to the CAV controlling circuit 28, the CAV controlling signal is supplied to a driver 24 via the switching circuit 29. In this state, the rotational speed of the spindle motor 23, and thus the rotational speed of the disk 21, is controlled at a constant rotational speed. When the switching circuit 29 is switched to a CLV controlling circuit 40 (constant linear velocity controlling means), a CLV controlling signal (constant linear velocity controlling signal) is supplied to the driver 24 via the switching circuit 29. In this state, the rotational speed of the spindle motor 23 is controlled so that a pick-up (an optical pick-up) scans the disk 21 at a linear velocity determined for each of a plurality of zones which are formed along a radial direction of the disk 21.

The pick-up controlling unit 27 controls focussing, tracking and seeking of the pick-up 26 according to an instruction from the controller 43. Additionally, the pick-up controlling unit 27 generates a tachometer (tach) pulse which corresponds to a travel distance of the pick-up 26 in a radial direction of the disk 21. The pick-up controlling unit 27 controls the pick-up 26 to trace a track on the disk 21 when the a regular reproducing operation is performed. The pick-up controlling unit 27 controls the pick-up 26 to move toward a target track when a seek operation is performed.

The controller 43 recognizes a travel distance of the pick-up 26 by the tach pulse supplied by the pick-up controlling unit 27. When the seek operation is performed, the controller 43 recognizes a travel distance of the pick-up 26 by the tach pulse so as to move the pick-up 26 by a distance from a current position to a target position. The travel distance of the pick-up 26 may be recognized by utilizing a tracking error signal.

The pick-up 26 projects a laser beam onto a track on the disk 21, and detects the reflected beam so as to read the signal recorded on the disk 21, and outputs a reproduction signal.

A waveform shaping circuit 34 (digital signal reproducing means) amplifies and shapes the reproduction signal supplied by the pick-up 26 so as to generate a row EFM signal as a reproduction digital signal. An operation of the waveform shaping circuit 34 is controlled by the control signal supplied by the controller 43. The waveform shaping circuit 34 is activated when tracking and focussing of the pick-up 26 are pulled in and thus the pick-up 26 is able to output the EFM signal. Additionally, an amplifying gain or a differential constant is changed according to the control signal so as to adapt the waveform shaping circuit 34 to various signal levels or bit frequencies which differ from the inner side to the outer side of the disk 21.

A synchronization detecting circuit 37 is provided with a synchronization clock and synchronization EFM data. The synchronization detecting circuit 37 determines whether the reproduction PLL circuit 36 is generating the correct synchronization EFM data and correct synchronization clock so as to output a synchronization/asynchronization determining signal. More specifically, the synchronization detecting circuit 37 detects a pattern comprising pulses, "11T/11T" (T is the period of a single bit), recorded on the disk 21. The synchronization detecting circuit 37 then determines whether the synchronization clock is in synchronization with the synchronization pattern so as to output the synchronization/asynchronization signal.

In this embodiment, the data recording area of the disk 21 is divided into a plurality of zones in a radial direction of the disk 21. In each of the zones, the rotational speed of the disk 21 is controlled so that the pick-up 26 scans at a predetermined reference linear speed, which is established for each of the zones, when a reproducing operation is performed. A position of the pick-up 26 relative to each of the zones is recognized by a radial position determining unit 38 described later. A zone clock is generated by a zone clock generating circuit 39 so as to control the pick-up 26 to move at the reference linear speed. A CLV control is performed by the CLV controlling circuit 40 by referring to the zone clock.

Figure 2:
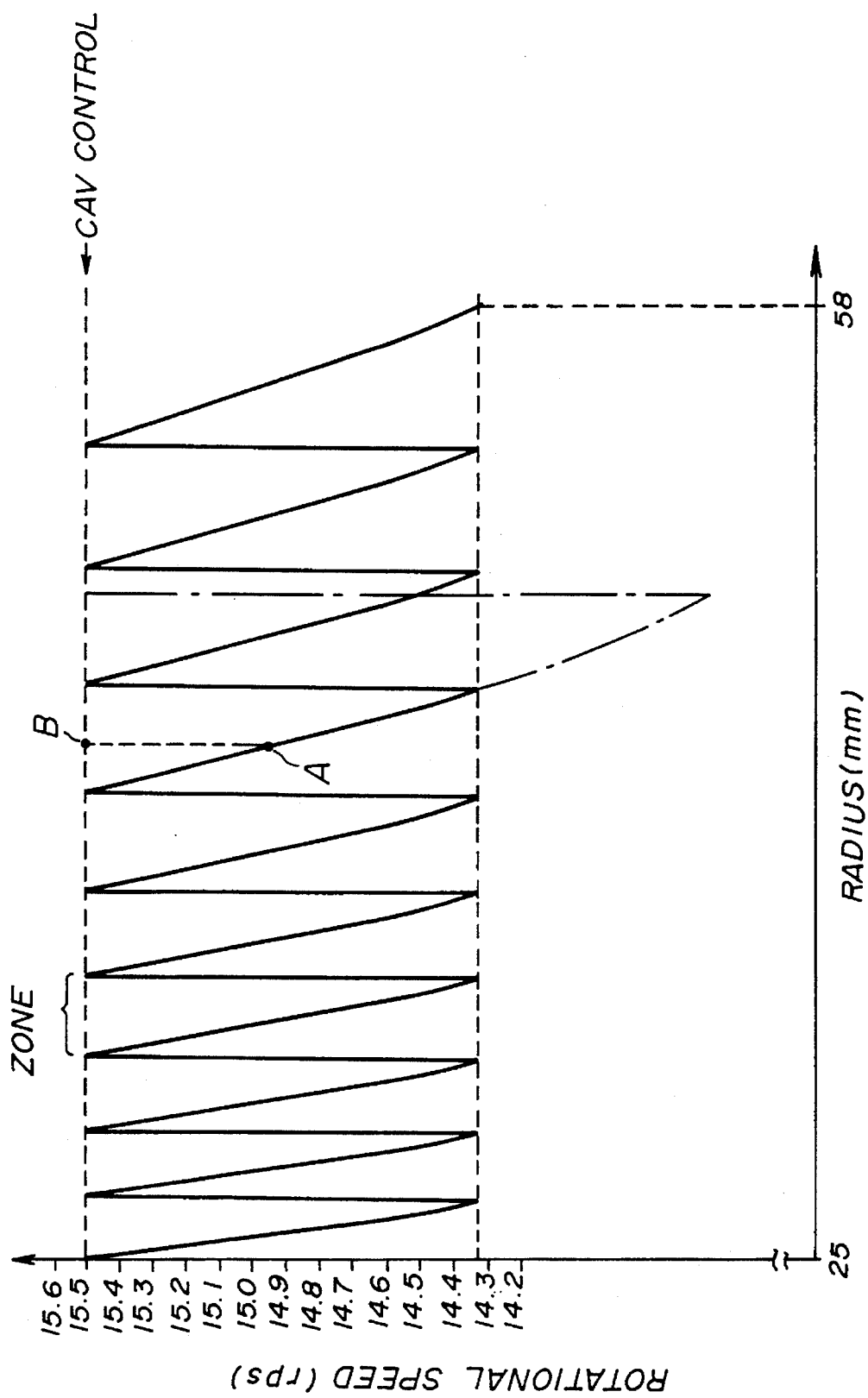
FIG. 2 is an illustration for explaining an example of a division for zones and a reference linear speed for each of the zones.

FIG. 2 is an illustration for explaining an example of a division of the zones and the reference linear speed for each of the zones. In the example shown in FIG. 2, the recording area of the disk 21 is divided into ten zones. The rotational speed of the spindle motor 23 is controlled so that the same minimum rotational speed of the disk 21 is set for each of the zones and the same maximum rotational speed of the disk 21 is set for each of the zones.

When the rotational speed of the disk 21 is controlled at a constant speed by the CAV controlling circuit 28, a bit frequency of the row EFM signal varies in proportion to a radial distance between the pick-up 26 and the center of the disk 21. The period of time 11T varies in inverse proportion to the radial distance.

The radial position determining unit 38, which corresponds to a radial position information generating means, is supplied with the row EFM signal from the waveform shaping circuit 34, and also supplied with the system clock signal. The radial position determining unit 38 determines the zone in which the pick-up 26 is located based on a count value obtained by counting the period of 11T by using the high frequency system clock.

The radial position determining unit 38 generates zone determining data (radial position information) which represents the result of the determination, and supplies it to the zone clock generating circuit 39. The radial position determining unit 38 also generates self-scan frequency controlling data, and supplies it to the reproduction PLL circuit 36. The self-scan frequency data is used for designating the bit frequency of the determined zone as a self-scan frequency.

The zone clock generating circuit 39 (read reference clock generating means) is supplied zone determining data, and also supplied with the system clock signal. The zone clock generating circuit 39 generates a zone clock signal (ZCLK) which has a frequency given to the zone indicated by the zone determining data. The zone clock data is supplied to the CLV controlling circuit 40 and the signal processing circuit 42. The frequency of the zone clock is in proportion to the reference linear speed and the bit frequency in each zone.

The CLV controlling circuit is supplied with the synchronization/asynchronization determining signal, the row EFM signal, the synchronization EFM data and the synchronization clock. The CLV controlling circuit 40 compares a frequency of the row EFM signal with a frequency of the zone clock when the reproduction PLL circuit 36 is not in synchronization with the row EFM signal, and generates a frequency error signal as the CLV controlling signal based on the comparison result. The frequency error signal is supplied to the switching circuit 29 of the spindle motor drive controlling unit 25. The CLV controlling circuit 40 compares a synchronization pattern detected from the row EFM signal with a phase of the zone clock when the reproduction PLL circuit 36 is in synchronization with the row EFM signal, and generates a frequency error signal as the CLV controlling signal based on the comparison result. The frequency error signal is supplied to the switching circuit 29 of the spindle motor drive controlling unit 25.

The signal processing unit 42 is supplied with the synchronization EFM data and the synchronization clock from the reproduction PLL circuit 36. The synchronization/asynchronization determining signal is supplied to the signal processing unit 42 from the synchronization detecting circuit 37. The zone clock signal is also supplied to the signal processing unit 23 from the zone clock generating circuit 39. The signal processing circuit 42 demodulates the EFM data when the reproduction PLL circuit 36 is in synchronization the row EFM signal. Additionally, the signal processing circuit 42 performs a process for an error correction according to the zone clock, and outputs the demodulated data to an upper apparatus.

The controller 43 switches the switching circuit 29 when the reproducing operation for each of the zones is performed so that the CLV controlling signal is selected and thus the spindle motor 23 is subjected to the CLV control. When the apparatus is in a waiting state or a seek operation is performed, the controller 43 switches the switching circuit 29 so that the CAV controlling signal is selected and thus the spindle motor 23 is subjected to the CAV control. Additionally, when a seek operation is performed, the controller 43 sends a command to the pick-up controlling unit 27 to move the pick-up 26 to a target track. It should be noted that the controller 43 uses address data, which is supplied from the signal processing unit 42 when a reproducing operation is performed, to determine a track position.

A detailed description will now be given of the reproduction PLL circuit 36, the radial position determining unit 38 and the CLV controlling circuit 40.

Figure 3:
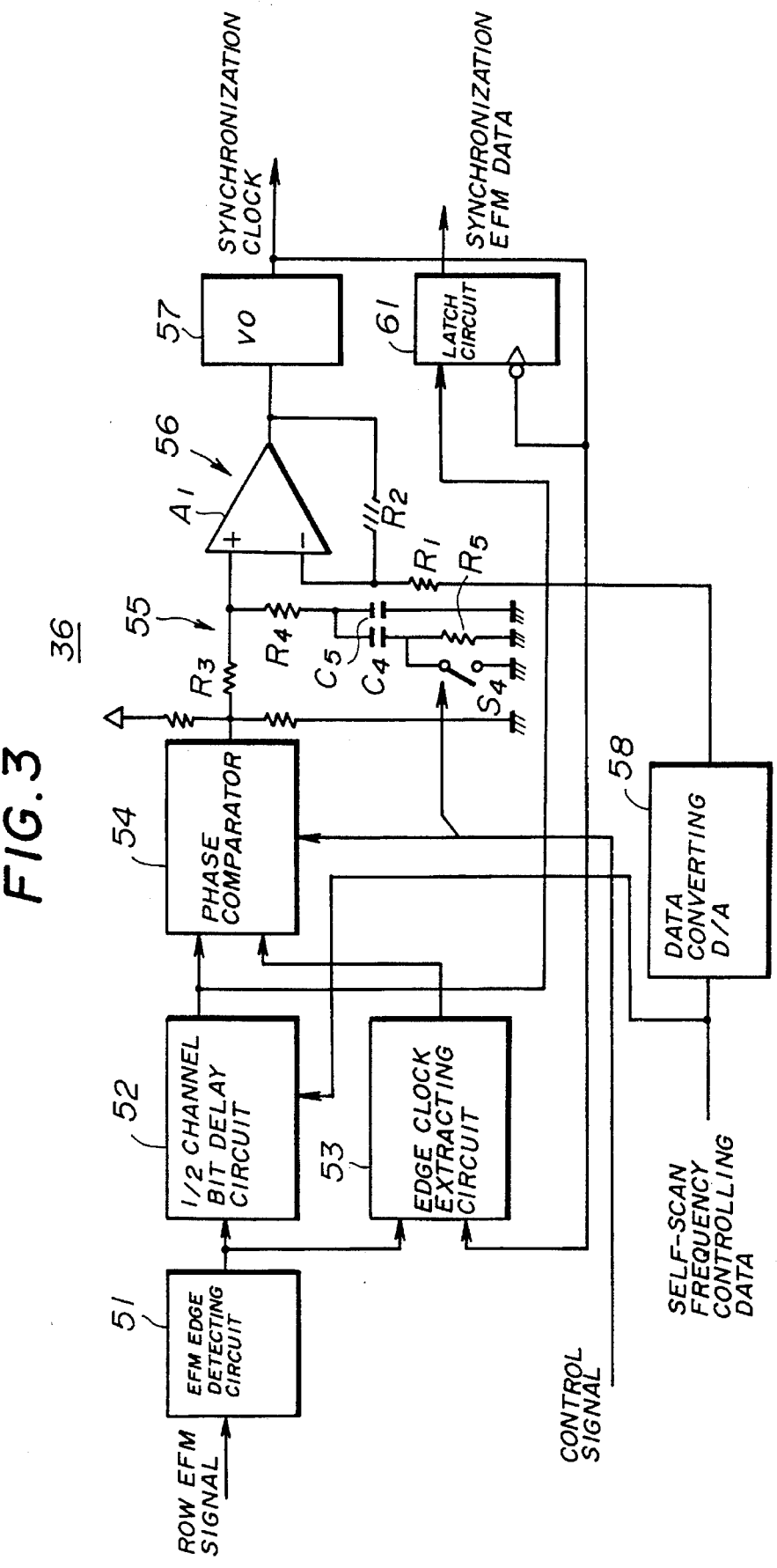
FIG. 3 is a block diagram of a reproduction PLL circuit shown in FIG. 1.

FIG. 3 is a block diagram of the reproduction PLL circuit 36. An EFM edge detecting circuit 51 detects an edge (a rising edge and a falling edge) of the row EFM signal supplied by the waveform shaping circuit 34 so as to generates an edge pulse. A ½ channel bit delay circuit 52 generates an edge pulse which corresponds to the edge pulse supplied by EFM edge detecting circuit 51 delayed by a ½ channel bit. This delay corresponds to the delay caused by an edge clock extracting circuit 53 described below.

A voltage controlled oscillator (VCO) 57 outputs a VCO clock having a frequency corresponding to a control voltage supplied by an amplifier 56 comprising an operator amplifier $A_1$ and resistors $R_1$ and $R_2$.

The edge clock extracting circuit 53 is supplied with the edge pulse signal from the EFM edge detecting circuit 51. The edge clock extracting circuit 53 outputs a first VCO clock pulse, as an extracted clock pulse, which is input after the edge pulse is input.

A phase comparator 54 compares the edge pulse supplied by the ½ channel bit delay circuit 52 with the extracted clock pulse supplied by the edge clock extracting circuit 53, and outputs a voltage corresponding to a phase difference between the two pulses. The output voltage of the phase comparator 54 is applied, as a phase error voltage, to a inverting input terminal of the amplifier 56 via a low-pass filter 55. The low-pass filter 55 comprises resistors $R_3$, $R_4$ and $R_5$, capacitors $C_4$ and $C_5$ and a switch $S_4$. The phase error voltage corresponds to a phase difference between the row EFM signal and the VCO clock.

A data converting D/A converter 58 is supplied with the self-scan frequency controlling data from the radial position determining unit 38. The data converting D/A converter 58 converts the analog self-scan frequency data to a digital data so as to generate a self-scan frequency setting voltage used for determining a self-scan frequency of the VCO 57. The self-scan frequency setting voltage is supplied to the inverting input terminal of the amplifier 56.

The control voltage applied to the VCO 57 by the amplifier 56 corresponds to the self-scan frequency setting voltage and the phase error voltage. Thus, a self-scan frequency is set in the VCO 57 according to the self frequency setting voltage, and the VCO clock is generated the frequency of which is controlled according to the phase error voltage.

The reproduction PLL circuit 36 outputs the VCO clock as the synchronization signal. The VCO clock is supplied to a trigger terminal of a latch circuit 61. The latch circuit 61 latches the EFM edge pulse output from the ½ channel bit delay circuit 52 at a falling edge of the VCO clock, and outputs the latched pulse as the synchronization EFM data.

When the self-scan frequency is set within a range in which a pull-in of a frequency is enabled for a bit frequency of the row EFM signal, a phase of the VCO clock is in synchronization with the EFM edge pulse output from the ½ channel bit delay circuit 52. At this time, the synchronization EFM data and the synchronization signal, which synchronize with the row EFM signal, are generated.

It should be noted that a delay period of the ½ channel bit delay circuit 52 is switched in accordance with the self-scan frequency controlling data. Accordingly, the ½ channel bit delay circuit 52 generates an accurate ½ channel delay regardless of a fluctuation in the bit frequency of the row EFM signal.

Additionally, the on/off operation of the phase comparator 54 is switched in accordance with the control signal supplied by the controller 43. The on/off of the switch $S_4$ of the low-pass filter 55 is switched by the control signal so as to vary a filter constant to change a pull-in range for the frequency.

Figure 4:
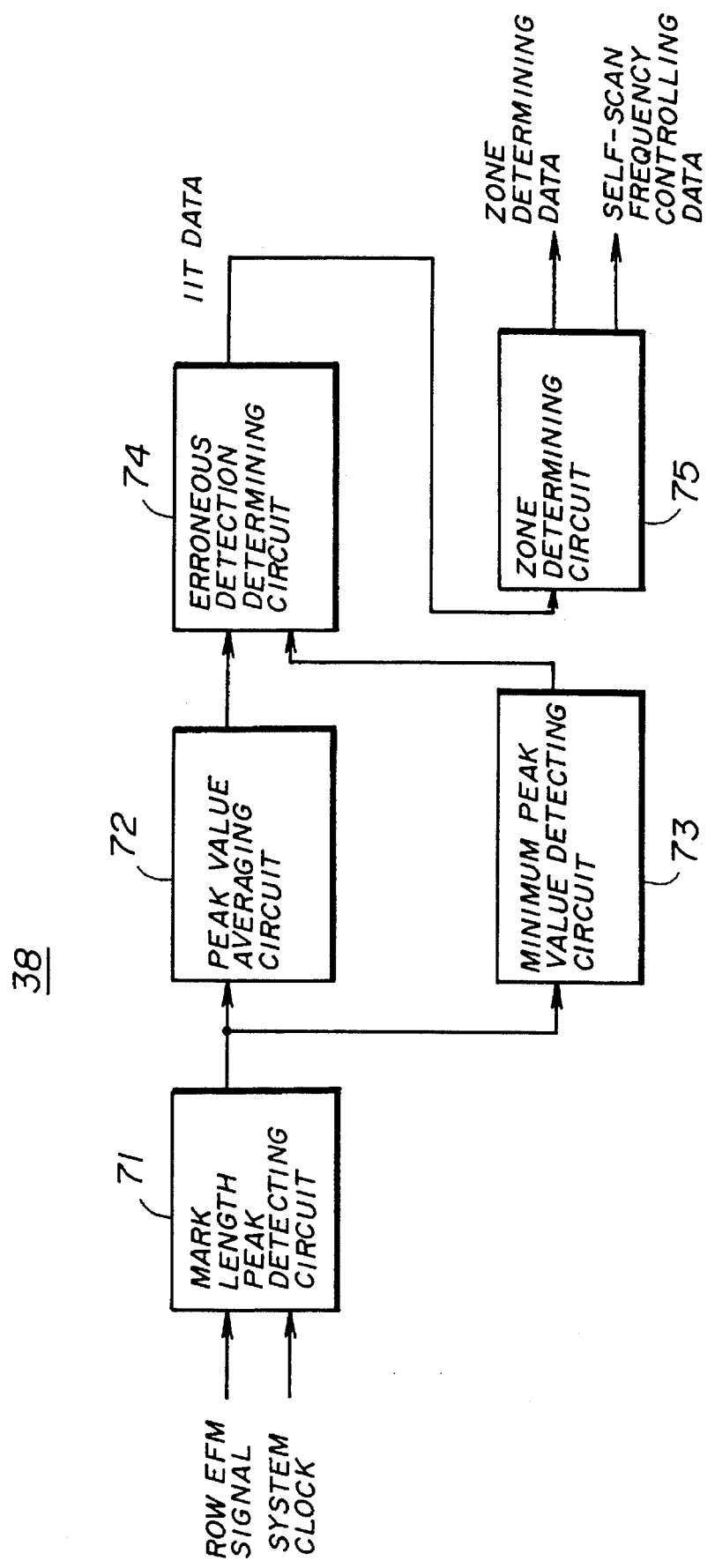
FIG. 4 is a block diagram of a radial position determining unit shown in FIG. 1.

FIG. 4 is a block diagram of the radial position determining unit 38. A mark length peak detecting circuit 70 detects 11T of the EFM signal, which corresponds to a pulse having the maximum width in the row EFM signal, during more than one frame period of the EFM signal. The mark length peak detecting circuit 71 outputs a count value as a peak value data, a count value of which is obtained by counting the period 11T by the use of the system clock which has a constant frequency.

There is a possibility that the peak value data generated by the mark length peak detecting circuit 71 is not the data representing the period of 11T due to reasons such as a drop out of a pulse. Accordingly, only a correct peak value data (11T data) is output by means of the peak value averaging circuit 72, a minimum peak value detecting circuit 73 and a erroneous detection determining circuit 74.

The peak value averaging circuit 72 is supplied with the peak value data from the mark length peak detecting circuit 71. The peak value averaging circuit 72 outputs an average value data which is obtained by averaging a predetermined number of samples of the peak value data. The minimum peak value detecting circuit 73 detects the minimum data among samples which are averaged by the peak value averaging circuit 72. The average value data and the minimum data are supplied to the erroneous detection determining circuit 74.

The erroneous detection determining circuit 74 determines that the data is correct when a difference between the average value data and the minimum data is less than a reference value, and determines that the data is incorrect when the difference is greater than the reference value.

When it is determined that the data is correct, the average value data is supplied to a zone determining circuit 75 as a correct 11T data.

It should be noted that the determination may be performed by comparing the average value data with the minimum data and the maximum data by adding a maximum peak value detecting circuit.

As mentioned above, the bit frequency of the row EFM signal varies in proportion to the radial distance of the pick-up 26 relative to the disk 21 when the disk 21 is controlled to rotate at a constant rotational speed by the CAV controlling circuit 28, and the value of the 11T data varies in inverse proportion to the radial distance of the pick-up 26.

The zone determining circuit 75 determines the zone corresponding to the 11T data supplied by the erroneous detection determining circuit 74. In the example of FIG. 2, one of the ten zones in which the pick-up 26 is located is determined by the value of the 11T data. The zone determining circuit 74 generates zone determining data which represents the determined zone, and supplies the determining data to the zone clock generating circuit 39. The zone determining circuit 74 also generates the self-scan frequency controlling data which designates the bit frequency of the determined zone as the self-scan frequency, and supplies the data to the reproduction PLL circuit 36.

As mentioned above, the self-scan frequency of the VCO 57 of the reproduction PLL circuit 36 is set to the self-scan frequency designated by the self-scan frequency controlling data. Thus, the self-scan frequency of the reproduction PLL circuit 36 is set equal to the bit frequency of the determined zone.

Figure 5:
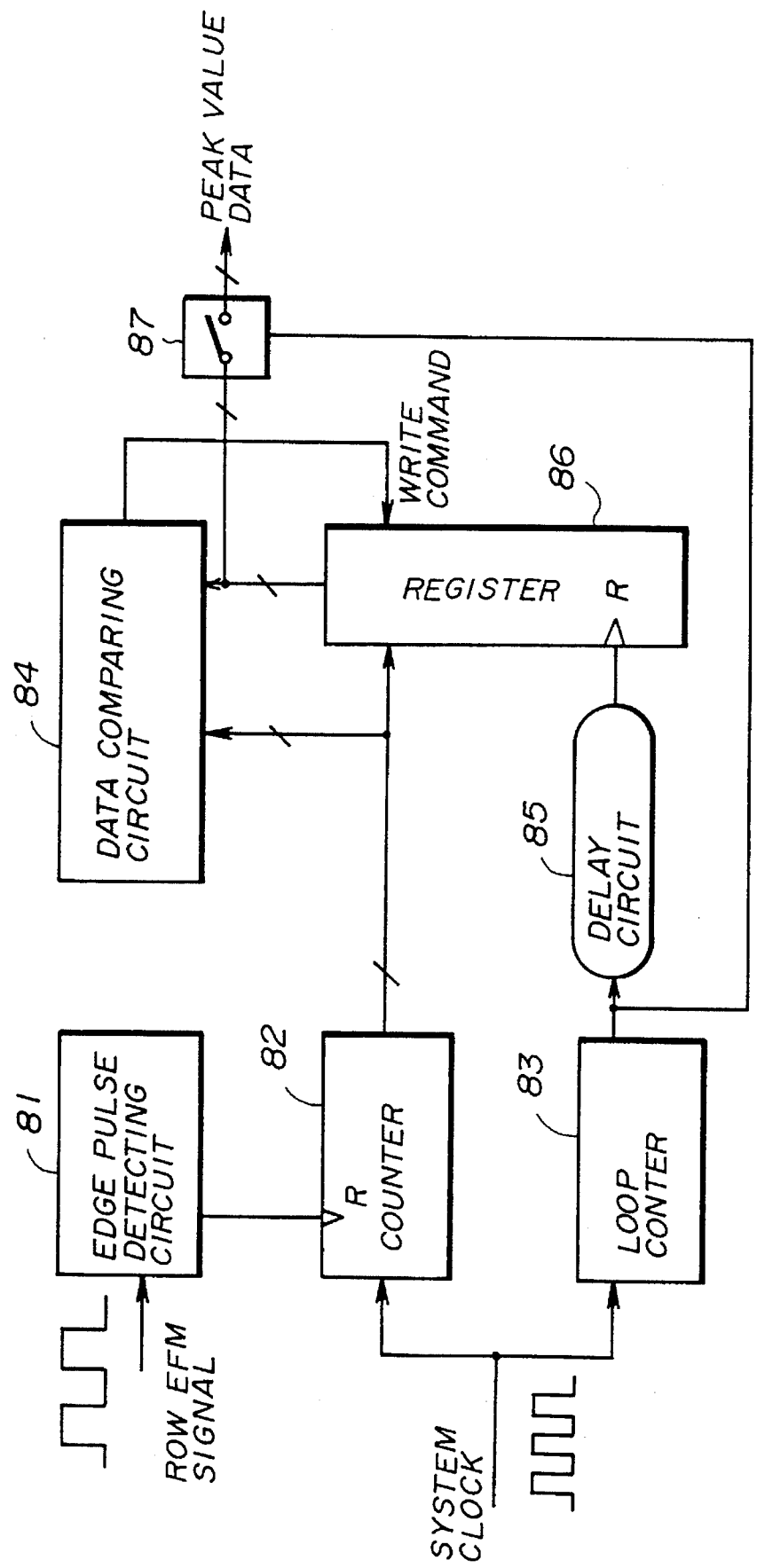
FIG. 5 is a block diagram of a mark length peak detecting circuit shown in FIG. 1.

FIG. 5 is a block diagram of the mark length peak detecting circuit 71. A counter 82 counts the system clock which has a high frequency. The edge pulse detecting circuit 81 detects a rising edge and a falling edge of the row EFM signal so as to generate an edge pulse. The counter 82 is reset when the edge pulse generated by the edge pulse detecting circuit 81 is supplied. Accordingly, the counter 82 counts each mark length (pulse width) in the row EFM signal by using the system clock, and outputs the mark length data.

A register 86 write the mark length data supplied by the counter 82 when a write command is input. A data comparing circuit 84 compares the mark length data supplied by the counter 82 with the mark length data stored in the register 86. When the mark length data supplied by the counter 82 is greater, the data comparing circuit 84 supplies the write command to the register 86.

The loop counter 83 counts the system clock, and generates a reset signal at a period more than a single EFM frame at the innermost part of the disk 21, that is, more than a period of 588T at the innermost part. The reset signal is supplied to a reset terminal of the register 86 via a delay circuit 85. The reset signal is also supplied to a switch 87, which is used for outputting data, as a control signal for the switch 87.

The register 86 stores the maximum mark length data at the end of the count period which is more than one EFM frame period. At the end of the count period, the maximum mark length data is output as the peak value data within the count period via the switch 87. When no error such as a drop out exists, the peak value data corresponds to the data representing the length of 11T data.

Figure 6:
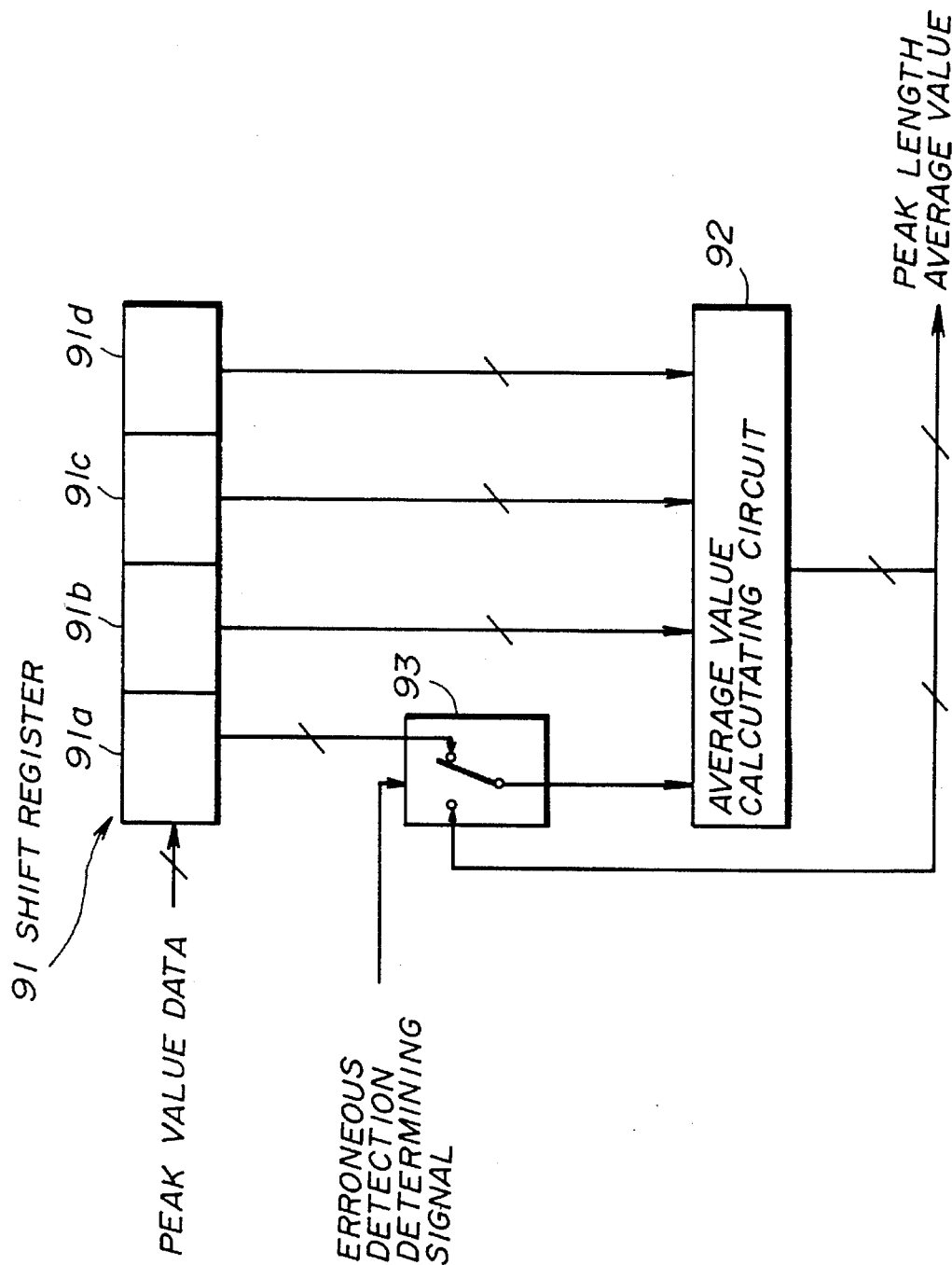
FIG. 6 is a block diagram of a peak value averaging circuit shown in FIG. 1.

FIG. 6 is a block diagram of the peak value averaging circuit 72. A shift register 91 stores four samples of the peak value data in registers 91a to 91d. When a new sample of the peak value data is supplied, the data stored in each of the registers 91a to 91d is shifted to the register on the right side.

A switch 93 is connected so that the data stored in the register 91a of the shift register 91 is supplied to the average value calculating circuit 92 when the erroneous detection determining signal is not supplied by the erroneous detection determining circuit 74. When the erroneous detection determining signal is supplied, the data output from the average value calculating circuit 92 is supplied to an input of the average value calculating circuit 92.

When the erroneous detection determining signal is not supplied, the peak value data of the four samples is supplied to the average value calculating circuit 92 from the registers 91a to 91d of the shift register 91. The average value calculating circuit 92 averages the data of four samples, and outputs the average value data.

When the erroneous detection determining signal is supplied, the average value calculating circuit 92 calculates the average value data using the previous average value data instead of the incorrect data stored in the register 91a of the shift register 91.

Figure 7:
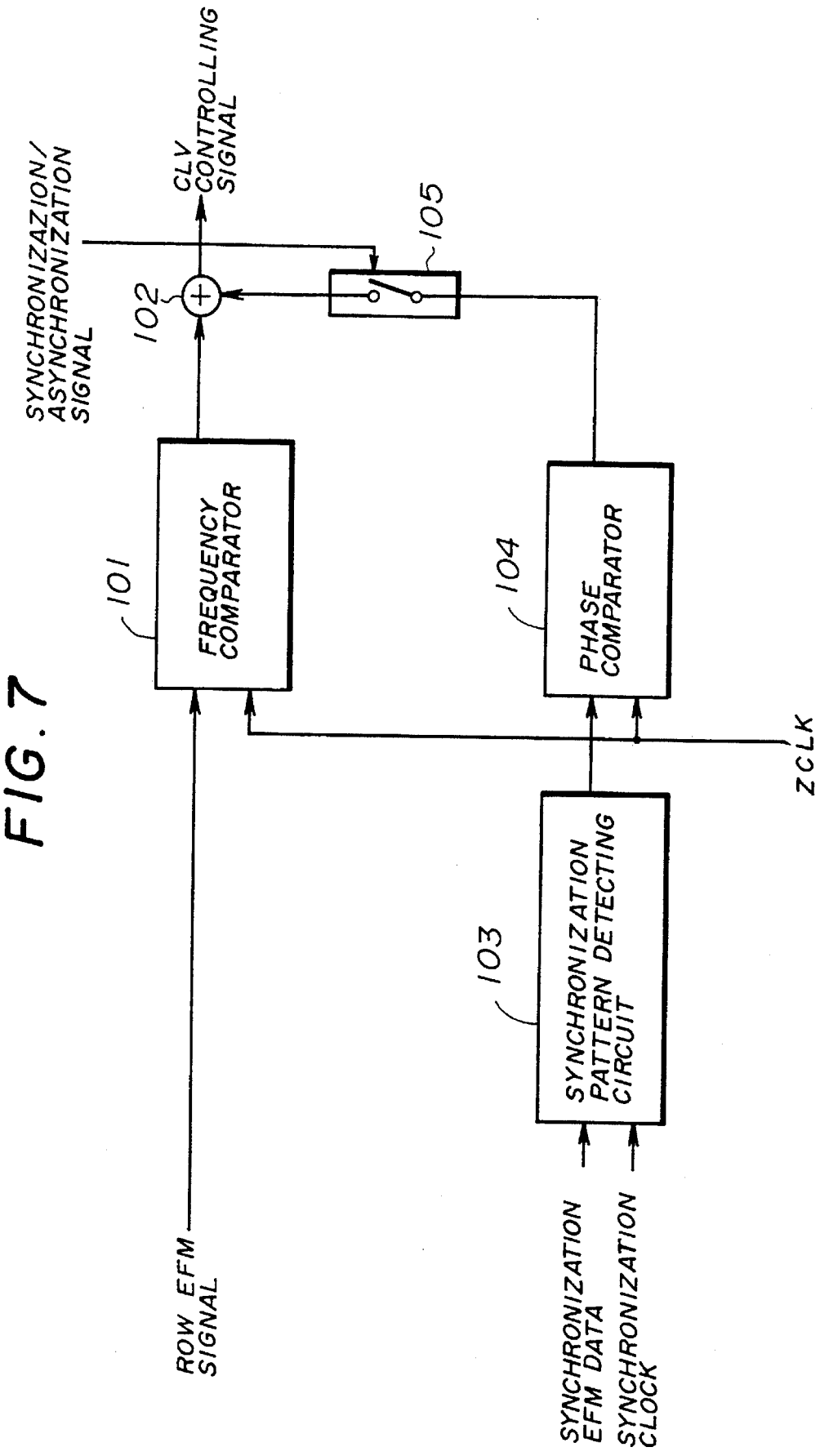
FIG. 7 is a block diagram of a CLV control circuit shown in FIG. 1.

FIG. 7 is a block diagram of the CLV controlling circuit 40. The CLV controlling circuit 40 comprises a frequency comparator 101, an adder 102, a synchronization pattern detecting circuit 103, a phase comparator 104 and a switch 105. The frequency comparator 101 compares the bit frequency of the row EFM signal with the frequency of the zone clock, and generates the frequency error signal. When the reproduction PLL circuit 36 is not in synchronization with the phase of the row EFM signal, the switch 105 is turned off by the synchronization/asynchronization signal. In this state, the frequency error signal is output as the CLV controlling signal via the adder 102. The CLV controlling signal is supplied to the switch circuit 29 of the spindle motor drive controlling unit 25.

When the reproduction PLL circuit 36 is in synchronization with the phase of the row EFM signal, the synchronization pattern detecting circuit 103 detects a synchronization pattern from the synchronization EFM data. The phase comparator 104 compares the synchronization pattern with the phase of the zone clock, and outputs the phase error signal. The phase error signal is supplied to the adder 102 via the switch 105 which is turned on by the synchronization/ asynchronization signal. The adder 102 outputs a signal as the CLV signal which is a sum of the frequency error signal and the phase error signal.

A description will now be given of an operation of the CD-ROM reproducing apparatus 20. When power is turned on or when waiting for an operation command from an upper apparatus (a control apparatus), the controller 43 switches the switch circuit 29 to the CAV controlling circuit 28 side so as to control the spindle motor 23 in accordance with the CAV control. According to the CAV control, the spindle motor 23 (the disk 21) is maintained at a maximum rotational speed for each of the zones (refer to FIG. 2).

Figure 8:
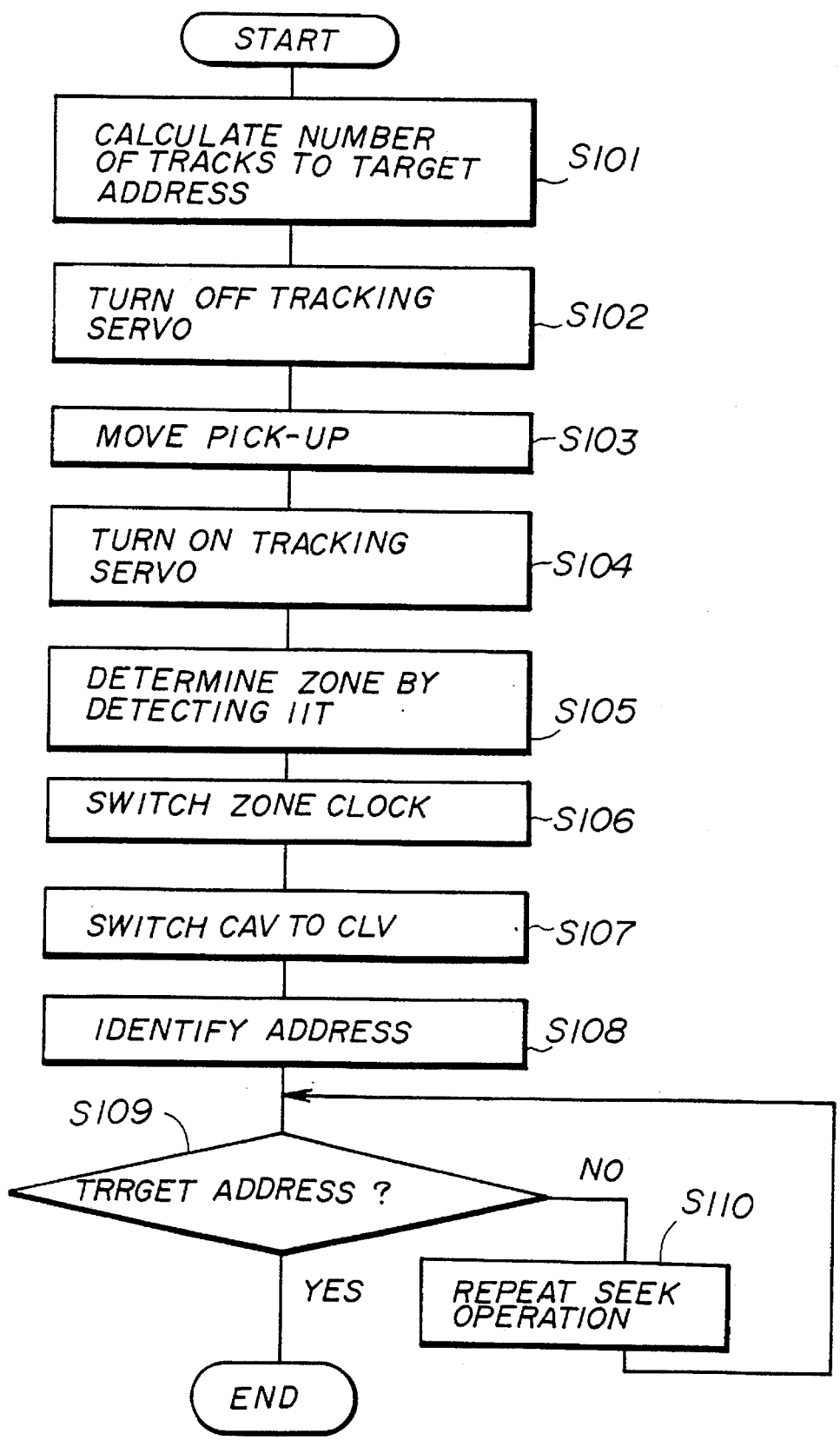
FIG. 8 is a flowchart of a seek operation.

FIG. 8 is a flowchart of a seek operation. As mentioned above, the spindle motor 23 is rotated at a constant rotational speed by the CAV control when the apparatus wait for an operation command. When the controller 43 receives from an upper apparatus, a command requesting a seek movement of the pick-up 26 to a target address, the seek operation is started.

The controller 43 calculate, in step 101, the number of tracks to the target address. The controller 43 then commands the pick-up controlling unit 27, in step 102, to turn off a tracking servo, and starts the pick-up 26 to move toward the target address in step 103. While the pick-up 26 is moved, the spindle motor 23 is under the CAV control.

The controller 43 recognizes travel of the pick-up 26 by the tach pulse supplied by the pick-up controlling unit 27. When the travel of the pick-up 26 reaches the number of tracks calculated in step 101, the controller 43 commands the pick-up controlling unit 27 to stop the movement of the pick-up 26, and thereafter, in step 104, turns on the tracking servo. When the tracking servo is turned on, the row EFM signal is obtained by the waveform shaping circuit 43. The row EFM signal is supplied to the radial position determining unit 38, the reproduction PLL circuit 36 and the CLV controlling circuit 40.

The radial position determining circuit 38 detects 11T from the row EFM signal, and determines, in step 105, the zone in which the pick-up 26 is located at the present time. The zone determining data as the result of the determination is supplied to the zone clock generating circuit 39. Additionally, the self-scan frequency controlling data which designates the bit frequency of the determined zone is supplied to the reproduction PLL circuit 36.

When the self-scan frequency controlling data is supplied to the reproduction PLL circuit 36 from the radial position determining unit 38, the bit frequency of the row EFM signal falls within a pull-in range of the frequency, and thus the reproduction PLL circuit 36 acquires a phase synchronization with the row EFM signal in a short time. Accordingly, the synchronization EFM data and the synchronization clock are output from the reproduction PLL circuit 36.

The zone clock generating circuit 39, which is supplied with the zone determining data, changes, in step 106, the zone clock before the seek operation to the zone clock having a frequency set for the zone in which the pick-up 26 is located at the present time. The zone clock is supplied to the CLV controlling circuit 40 and the signal processing circuit 42.

The CLV controlling circuit 40 generates the CLV controlling signal by which the spindle motor 23 is controlled to maintain the reference linear speed for the zone. The CLV controlling signal is generated using the row EFM signal, the synchronization EFM signal and the synchronization clock by referring to the zone clock which determines the reference linear speed for each zone.

The controller 43 determines, in step 107, that the determination of the zone has been completed and the zone clock has been changed when the zone determining data is supplied by the radial position determining unit 38. The switch circuit 29 is then switched to the CLV controlling circuit 40. Accordingly, the CLV controlling signal is supplied to the spindle motor 23 so that the spindle motor 23 is controlled by the CLV control so that the reference linear speed given to the zone in which the pick-up 26 is located is maintained.

If the minimum rotational speed for each zone is set equal to each other and the maximum rotational speed for each of the zones is set equal to each other as shown in FIG. 2, and if a range of variation of the rotational speed in a single zone is set to a few percent, the rotational speed of the spindle motor 23 is changed to the reference linear speed required at the target address in the zone in a short time with a small power consumption.

The signal processing circuit 42 demodulates the data by using the synchronization EFM data and the synchronization clock. The signal processing circuit 42 also perform an error correction by using the zone clock so as to generate the demodulated data. The address data in the demodulated data is supplied to the controller 43.

In step 108, the controller 43 identifies the address at which the pick-up 26 is located by the address data supplied by the signal processing circuit 42. It is determined, in step 109, whether or not the present address corresponds to the target address. If it is determined that the present address does not correspond to the target address, the routine proceeds to step 110 to repeat the seek operation. If it is determined, in step 109, that the present address corresponds to the target address, the seek operation is ended. Thereafter, a reproducing operation is performed from the target address under the CLV control.

For example, referring to FIG. 2, it is supposed that the point A indicates the target address and the reference rotational speed required at the target address. The pick-up 26 is moved to a position near the target address while the rotational speed of the spindle motor 23 is maintained at the maximum speed for the zone under the CLV control. After the pick-up reaches the target address, this state is indicated by the point B, the spindle motor 23 is decelerated from the maximum speed to the reference rotational speed in a short time, and the state is changed to the point A. After that, the reproducing operation is performed.

After the reproducing operation is ended, the controller 43 controls the pick-up controlling unit 27 so as to maintain the pick-up 26 at a position at which the reproducing operation is ended. The controller 43 then waits for a next operation command or a next seek command. If the next command is supplied in a predetermined period of time to perform a reproducing operation from the address at which the previous reproducing operation has ended, the reproducing operation is started immediately. If the command is not supplied in the predetermined period of time, the controller 43 switches from the CLV control to the CAV control. Thus, the spindle motor 23 is controlled to rotate at the maximum rotational speed for each zone.

It should be noted that when the apparatus enters the reproducing operation under the CLV control, the 11T data output from the erroneous detection determining circuit 74 of the radial position determining unit 38 becomes constant, and the 11T data does not vary when the pick-up 26 moves beyond the border between the zones. Accordingly, the zone determining circuit 75 continuously output the zone-determining data and the self-scan frequency controlling data even when the pick-up 26 moves to another zone.

Accordingly, when data bridging over two zones is reproduced, the rotational speed of the spindle motor 23 is maintained at the reference linear speed at the address at which the reproducing operation is started under the CLV control, and thus a continuous reproducing operation can be performed as indicated by chain lines in FIG. 2. In this case, when the reproducing operation is ended, the operation is switched to the CAV control by the controller 43, and thus the spindle motor 23 is controlled to the maximum rotational speed under the CAV control.

A description will now be given, with reference to FIG. 2, of a division of the recording area of the disk 21 into the plurality of zones. The description is based on the assumption that the minimum speed of one zone is set equal to the maximum speed of the adjacent zone on the outer side. If the rotational speed of the disk 21 is constant, a reading speed of the data on the disk 21 is fastest at the outermost part of the disk 21. Accordingly, it is preferable to set the reference linear speed at the maximum when the pick-up moves to the outermost zone so that the data reading rate corresponds to the allowable maximum data transfer rate of the CD-ROM reproducing apparatus 20. The minimum rotational speed (indicated by radius of 58 mm) for the outermost zone corresponds to the minimum rotational speed of the spindle motor 23.

An allowable range of variation of the rotational speed is determined according to a torque characteristic of the spindle motor 23. The common maximum speed for each of the zones is determined by considering the allowable range of the variation.

When the minimum rotational speed of the spindle motor is given, the number of zones and the common maximum speed are determined in the following method. In the following case, the recording area of the disk 21 is divided into n zones. The following relationship (1) is established, where $r_{out}$ is the radius of the outermost part of the disk; $V_0$ is a reference linear speed for the outermost zone; $w_L$ is a minimum angular velocity corresponding to the minimum rotational speed.

$$V_0 = r_{out} w_L \qquad (1)$$

The following relationship (2) is established, where $r_1$ is an innermost radius of the outermost zone; $w_H$ is a maximum angular velocity corresponding to the maximum rotational speed.

$$V_0 = r_1 w_H \qquad (2)$$

The following relationship (3) is obtained from the relationships (1) and (2).

$$r_1 = r_{out}(w_L/w_H) \qquad (3)$$

A reference linear speed $V_1$ for a second zone which is adjacent to the outermost zone is represented by the following expression (4).

$$V_1 = r_1 w_L \qquad (4)$$

The following relationship (5) is established, where $r_2$ is an innermost radius of the second zone.

$$V_1 = r_2 w_H \qquad (5)$$

The following relationship (6) is obtained from the relationships (3), (4) and (5).

$$r_2 = r_1(w_L/w_H) = r_{out}(w_L/w_H)^2 \qquad (6)$$

Accordingly, an innermost radius $r_k$ of the kth zone ($1 \leq k \leq n$) is expressed by the following expression (7).

$$r_k = r_{out}(w_L/w_H)^k \qquad (7)$$

Similarly, an innermost radius $r_{in}$ of the innermost zone is represented by the following expression (8).

$$r_{in} = r_{out}(w_L/w_H)^n \qquad (8)$$

Solving the expression (8) for $w_H$, the following expression (9) is obtained.

$$w_H = [(r_{out}/r_{in})^{1/n}] w_L \qquad (9)$$

Accordingly, the number n of zones and the maximum angular velocity $w_H$ are easily obtained according to the expression (9) while the range of fluctuation is in the allowable rotational speed of the spindle motor 23.

In the example of FIG. 2, the reference linear speed for the outermost zone is set four times as high as a speed (1.3 m/sec) of a regular CD, and the number of zones is set to 10.

It should be noted that the number n of the zones and the maximum angular velocity $w_L$ may be obtained from the expression (9) by determining the maximum rotational speed under the CAV control so that the linear speed at the outermost part under the CAV control becomes the maximum allowable linear speed. In this case, the maximum value of the bit frequency of the row EFM signal under the CAV control can be less than that obtained when the minimum rotational speed is determined first, and thus a detection of the 11T becomes easy.

As mentioned above, in the CD-ROM reproducing apparatus 20, a range of variation in the rotational speed of the spindle motor 23 is greatly reduced as compared to the conventional apparatus using the CLV control by setting the frequency of the zone clock for each zone so that a difference between the maximum rotational speed and the minimum rotational speed is about a few percent. Accordingly, a desired seek operation time is reduced and the torque of the spindle motor can be greatly reduced as compared to the conventional apparatus using the CLV control. Thus, the cost of the spindle motor is reduced, and the power consumption of the spindle motor when a seek operation is performed can be reduced. Additionally, since the range of variation in the rotational speed of the spindle motor is decreased, the seek time can be less than that of the conventional apparatus by using a spindle motor having an appropriate torque.

Additionally, since an error correction is performed by using the zone clock, as a read reference clock, which is independent from the synchronization clock, the error rate is maintained at the same level as that of the conventional apparatus using the CLV control.

Figure 9:
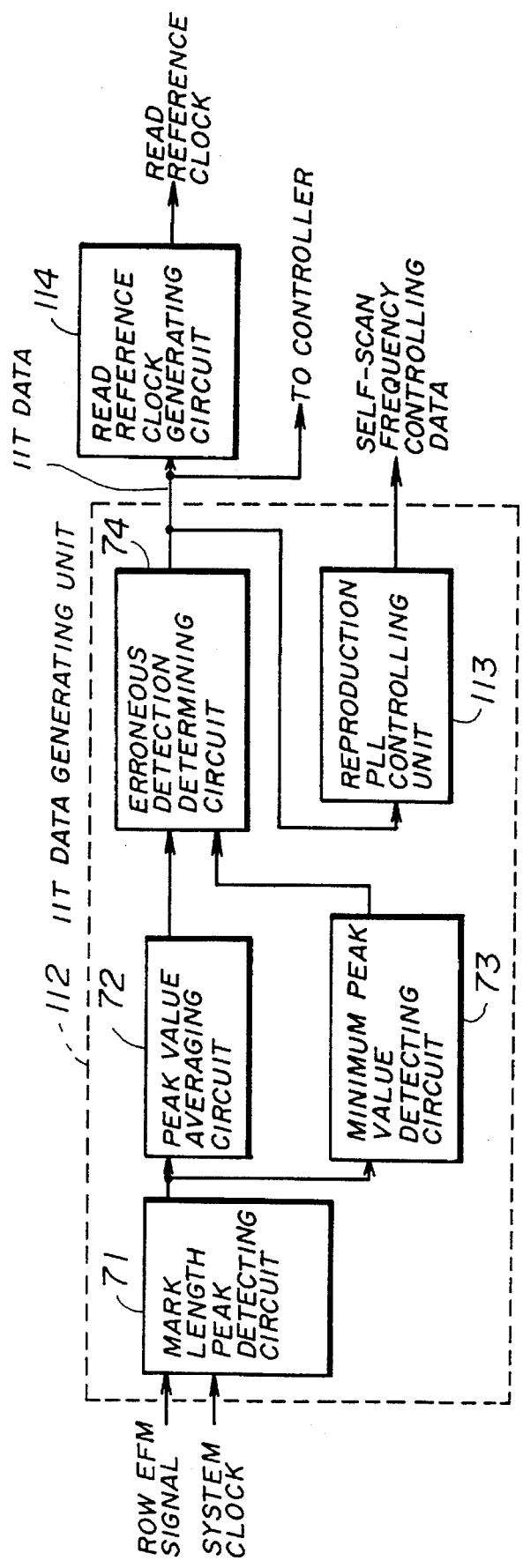
FIG. 9 is a block diagram of a 11T data detecting circuit and a read reference clock generating circuit in a second embodiment according to the present invention.

A description will now be given, with reference to FIG. 9, of a second embodiment according to the present invention. FIG. 9 is a block diagram of a 11T data generating unit 112 and a read reference clock generating circuit 114 provided in a CD-ROM reproducing apparatus according to the second embodiment. The CD-ROM reproducing apparatus shown in FIG. 9 has the same construction as that of the CD-ROM reproducing apparatus 20 shown in FIG. 1 except that the radial position determining unit 38 and the zone clock generating circuit 39 are replaced with the 11T data generating unit 112 and the read reference clock generating circuit 114, respectively. Thus, in FIG. 9, parts that are the same as the parts shown in FIG. 4 are given the same reference numerals, and descriptions thereof will be omitted.

After the movement of the pick-up 26 is completed in the seek operation, the 11T data corresponding to the track on which the pick-up 26 is currently positioned is supplied to the reproduction PLL controlling unit 113 of the 11T generating unit 112 from the erroneous detection determining circuit 74. As previously mentioned, the 11T data is in inverse proportion to the frequency of the row EFM signal. The reproduction PLL controlling unit 113 generates self-scan frequency controlling data which designates the 11T data corresponding to the bit frequency of the row EFM signal as the self-scan frequency. The reproduction PLL controlling unit 113 holds the value of the self-scan frequency controlling data until the next seek oration is performed.

The reproduction PLL circuit 36 is supplied with the self-scan frequency controlling data from the reproduction PLL controlling circuit unit 113, and, thus, the bit frequency of the row EFM signal corresponding to the 11T data is set in the reproduction PLL circuit 36 as the self-scan circuit 36. When the self-scan frequency is established, the reproduction PLL circuit 36 is synchronized with the row EFM signal.

The read reference clock generating circuit 114 is supplied the 11T data from the erroneous detection determining unit 74, and generates a read reference clock having a frequency which is in proportion to the bit frequency of the row EFM signal represented by the 11T data. The frequency of the read reference clock determines a reference linear speed which corresponds to the bit frequency of the row EFM signal. The read reference clock generating circuit 114 continuously outputs the same read reference clock until a next seek operation is performed.

FIG. 10 is an illustration for explaining the CAV control and the CLV control performed in the second embodiment. In the second embodiment, the spindle motor 23 is put under the CAV control when the apparatus waits for an operation command or a seek operation is performed. A reproducing operation is performed under the CLV control immediately after the movement of the pick-up 26 is completed.

When the movement of the pick-up 26 is completed, the self-scan frequency is established in the reproduction PLL circuit 36 as mentioned above in which the self-scan frequency corresponds to the 11T data at the completion of the movement of the pick-up 26 under the CAV control. Additionally, the read reference clock corresponding to the 11T data is generated and is supplied to the CLV controlling circuit 40 and the signal processing circuit 42. The signal processing circuit 42 is then able to generate the demodulated data.

The controller 43 switches from CAV control to the CLV control when the movement of the pick-up 26 is completed. Accordingly, a reproducing operation can be started under the CLV control immediately after the rotational speed of the spindle motor 23 is set under the CAV control.

FIG. 10 illustrates a condition in which a reproducing operation is performed according to the reference linear speed under the CLV control from a state in which the rotational speed of the spindle motor 23 is at the maximum rotational speed at the target address indicated by point D immediately after the pick-up 26 is moved to the target position.

When the reproduction of the data is completed, the controller 43 switches from the CLV control to the CAV control. Thus, the spindle motor 23 is controlled to rotate at the maximum rotational speed under the CAV control.

In the second embodiment, a data reproducing operation can be started immediately after the movement of the pick-up 26 is completed. Accordingly, variation in the rotational speed of the spindle motor 23 during a seek operation can be almost eliminated. Thus, the second embodiment can reduce the torque required for the spindle motor further than that of the first embodiment, and a seek time can be reduced further. Additionally, since the establishment of the zones is not needed, design of the system is easy.

It should be noted that an average data transfer rate over the entire disk 21 can be increased by setting the maximum rotational speed under the CAV control so that the data transfer rate at the outermost position of the disk becomes the maximum allowable value.

The present invention is not limited to the specifically disclosed embodiments, and variations and modifications may be made without departing from the scope of the present invention.

What is claimed is:

1. An optical disk reproducing apparatus for reproducing data recorded on an optical disk by reading a digital signal including clock information by an optical pick-up, said digital signal being recorded in a uniform recording density, said optical disk reproducing apparatus comprising:

a spindle motor for rotating said optical disk in accordance with a rotation control signal;

constant rotational speed controlling means for generating a constant rotational speed controlling signal which controls a rotational speed of said optical disk at a constant rotational speed;

switching means for outputting a constant angular speed controlling signal as said rotation controlling signal when said optical pick-up is moved during a seek operation, and outputting a constant linear speed controlling signal as said rotation controlling signal when reproducing the data recorded on said optical disk, said constant linear speed controlling signal controlling the rotational speed of said optical disk at a constant linear speed;

digital signal reproducing means for generating a reproduction digital signal from a reproduction signal supplied by said optical pick-up;

radial position information generating means for generating radial position information representing a radial distance of said optical pick-up from a center of said optical disk by using said reproduction digital signal supplied by said digital signal reproducing means while said optical disk is rotated at a constant rotational speed by said constant rotational speed controlling means;

read reference clock generating means for generating a read reference clock used as a reference clock for determining a reference linear speed of said optical disk relative to said optical pick-up during a reproducing operation, a frequency of said read reference clock increasing as said radial distance represented by said radial position information increases;

a reproduction PLL circuit for generating reproduction data and a synchronization signal which are in synchronization with said reproduction digital signal supplied by said digital signal reproducing means, said reproduction PLL circuit comprising a variable frequency oscillator so that a self-scan frequency is set in said variable frequency oscillator, said self-scan frequency increasing as said radial distance represented by said radial position information increases; and constant linear speed controlling means for supplying a frequency error signal to said switching means as said constant linear speed controlling signal by comparing said read reference clock with said reproduction data so that said spindle motor maintains said reference linear speed determined by said read reference clock.

2. The optical disk reproducing apparatus as claimed in claim 1, wherein said radial position information generating means divides a recording area of said optical disk into a plurality of zones arranged in a radial direction of said optical disk, said radial position information generating means generating zone determining data as said radial position information, said zone determining data indicating one of said zones in which said optical pick-up is located when a movement of said optical pick-up is completed for a seek operation;

said read reference clock generating means generates the read reference clock having a frequency set in one of said zones designated by said zone determining data supplied by said radial position information generating means, said read reference clock generating means setting a frequency of the read reference clock for each of said zones so that the frequency of the read reference clock of each of said zones increases toward an outside of said disk; and said reproduction PLL circuit is operated according to a self-scan frequency which is equal to a bit frequency determined by a frequency of said read reference clock designated by said zone determining data.

3. The optical disk reproducing apparatus as claimed in claim 2, wherein said read reference clock generating means generates the read reference clock having a frequency corresponding to said zone determining data supplied by said radial position information generating means when a movement of said optical pick-up during a seek operation is completed, the frequency of the reference clock being maintained until a reproducing operation for a series of the data recording on said optical disk is completed.

4. The optical disk reproducing apparatus as claimed in claim 2, wherein a division of said recording area of said optical disk and an establishment of the frequency for each of said zones is made so that a maximum rotational speed of said optical disk for each of said zones is substantially the same and a minimum rotational speed of said optical disk for each of said zones is substantially the same.

5. The optical disk reproducing apparatus as claimed in claim 4, wherein the frequency of said read reference clock for each of said zones is determined so that said reference linear speed at an outermost position of said optical disk is a maximum allowable speed determined by a data transfer rate of said optical disk reproducing apparatus.

6. The optical disk reproducing apparatus as claimed in claim 4, wherein the constant rotational speed established by said constant rotational speed controlling means is equal to said maximum rotational speed.

7. The optical disk reproducing apparatus as claimed in claim 5, wherein the constant rotational speed established by said constant rotational speed controlling means is equal to said maximum rotational speed.

8. The optical disk reproducing apparatus as claimed in claim 4, wherein $r_{out}$ is a radius of the outermost position of said recording area of said optical disk; $r_{in}$ is a radius of an innermost position of said recording area of said optical disk; $w_L$ is a minimum angular velocity corresponding to the minimum rotational speed; $w_H$ is a maximum angular velocity corresponding to the maximum rotational speed; $r_k$ is an innermost radius of the kth zone ($1 \leq k \leq n$);

one of the maximum angular velocity $w_H$ and the minimum angular velocity $w_L$ is determined by evaluating a linear speed at an outermost position;

a number n of zones and said one of the maximum angular velocity $w_H$ and the minimum angular velocity $w_L$ are determined so that a difference between the maximum angular speed $w_H$ and the minimum angular speed $w_L$ becomes a predetermined value obtained from;

$$w_H = [(r_{out}/r_{in})^{1/n}] w_L$$

an extent of each of said zones is determined by:

$$r_k = r_{out}(w_L/w_H)^k$$

the frequency of the read reference clock for each of said zones is established in accordance with the reference linear speed determined by values of $r_{out}$, $r_{in}$, $w_H$, $w_L$ and $r_k$.

9. The optical disk reproducing apparatus as claimed in claim 1, wherein said read reference clock generating means generates the read reference clock by which the reference linear speed is set as the linear speed at a radial position represented by said radial position information when a movement of said pick-up is completed during a seek operation; and said reproduction PLL circuit is operated according to a self-scan frequency which is equal to a bit frequency determined by a frequency of said read reference clock.

10. The optical disk reproducing apparatus as claimed in claim 9, wherein a maximum rotational speed of said optical disk is set to a constant rotational speed controlled by said constant rotational speed controlling means, said maximum rotational speed being a maximum allowable linear speed of said optical disk relative to said pick-up at an outermost position of said recording area of said optical disk.

11. The optical disk reproducing apparatus as claimed in claim 1, wherein said reproduction digital signal includes a synchronization signal having a maximum pulse width for each of a plurality of frames having a predetermined bit length; and said radial position information generating means comprises a maximum pulse width detecting unit detecting the maximum pulse width from said reproduction digital signal for each period which is longer than a period of each of said plurality of frames of said reproduction digital signal at an innermost position of said recording area of said optical disk, said radial position information generating means generating the radial position information corresponding to a value of said maximum pulse width detected by said maximum pulse width detecting unit.

* * * * *